March 30, 1926. 1,578,476
D. C. SLAGHT
INTERNAL COMBUSTION ENGINE
Filed April 9, 1924 5 Sheets-Sheet 1

Witnesses

Inventor
Daniel C. Slaght
By Richard B. Owen,
Attorney

March 30, 1926.  1,578,476

D. C. SLAGHT

INTERNAL COMBUSTION ENGINE

Filed April 9, 1924   5 Sheets-Sheet 4

WITNESSES

Inventor
Daniel C. Slaght
By Richard B. Owen
Attorney

March 30, 1926.  
D. C. SLAGHT  
INTERNAL COMBUSTION ENGINE  
Filed April 9, 1924  
1,578,476  
5 Sheets-Sheet 5

Inventor  
Daniel C. Slaght  
WITNESSES  
By Richard B. Owen,  
Attorney

Patented Mar. 30, 1926.

1,578,476

UNITED STATES PATENT OFFICE.

DANIEL C. SLAGHT, OF EASTON, PENNSYLVANIA.

INTERNAL-COMBUSTION ENGINE.

Application filed April 9, 1924. Serial No. 705,326.

*To all whom it may concern:*

Be it known that I, DANIEL C. SLAGHT, a citizen of the United States, residing at Easton, in the county of Northampton and State of Pennsylvania, have invented certain new and useful Improvements in Internal-Combustion Engines, of which the following is a specification.

This invention relates to internal combustion engines of the two cycle type and the primary object of the invention is to provide a two cycle internal combustion engine having a pair of oppositely disposed pistons arranged in each cylinder, whereby upon explosion of the charge in the cylinders, the charge will act equally on both of the pistons, thereby performing a double acting engine.

A further object of this invention is the provision of a double acting two cycle engine having a crankshaft disposed at each end of the cylinders, and having the connecting rods of the pistons arranged at quarters on the crankshaft, so as to produce an even smooth running engine.

A further object of the invention is the provision of novel means for connecting the connecting rods of the pistons for operating in a single cylinder with the crank arms of the oppositely disposed crankshaft, the crank arms being arranged in different positions relative to one another, whereby one of the pistons will be always in advance of the other system, thereby eliminating a dead center in the engine and preventing back fire in the engine.

A further object of the invention is the provision of novel means for compressing air into the crank case of the engine and for forcing the air under pressure simultaneously to the carbureter and to the combustion chamber of the cylinders.

A further object of the invention is the provision of novel means for operatively connecting the crankshafts of the engine together by the use of intermeshing gears, whereby the crankshafts will at all times work synchronously relative to one another, the intermediate gear utilized for connecting the crankshafts together being mounted in a novel manner on the engine, whereby the same can be adjusted to take up play and wear relative to the other gears keyed to the crankshafts.

A still further object of the invention is to provide an improved internal combustion engine of the above character, which will be durable and efficient in use, one which will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1:
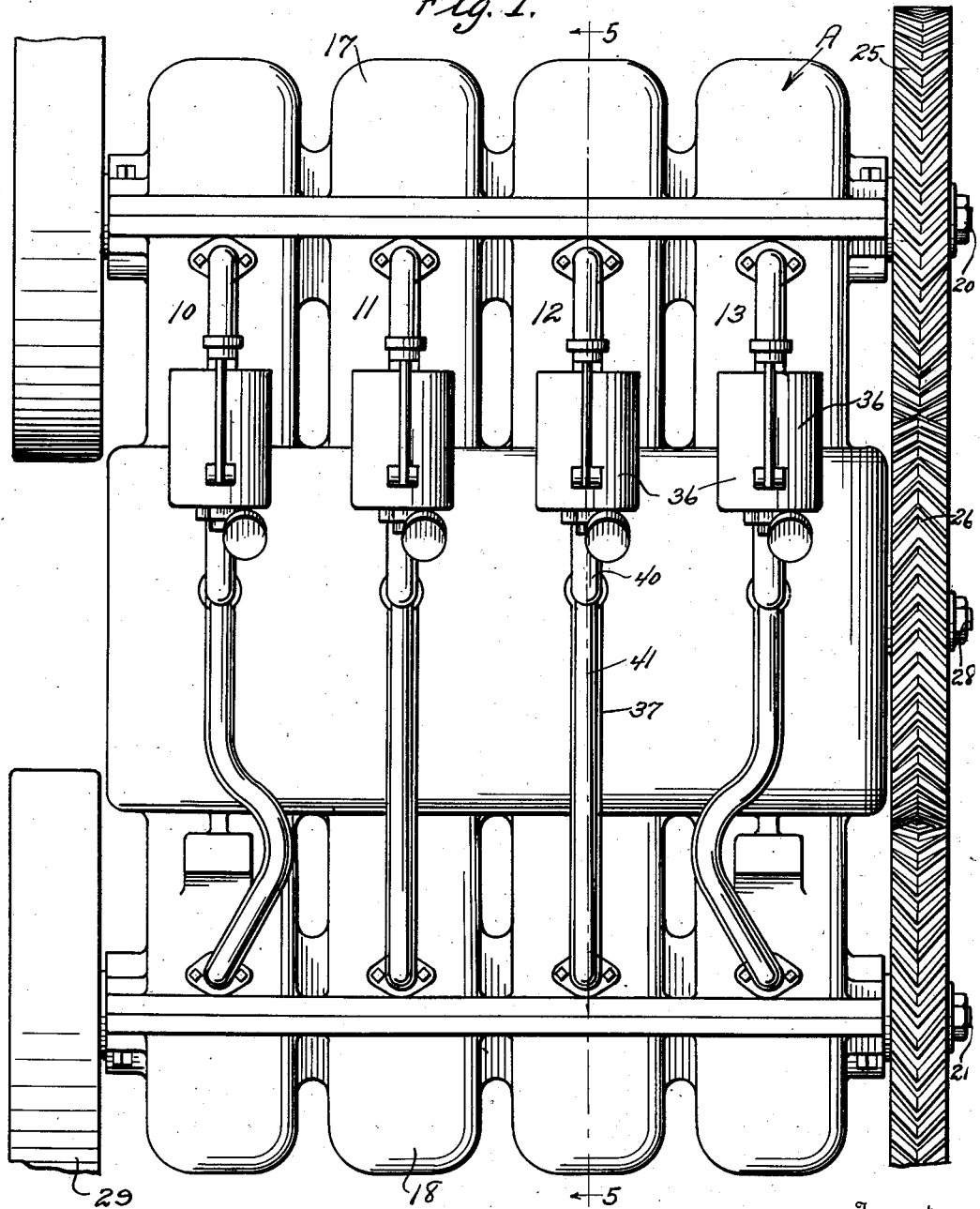
Figure 1 is a side elevation of the improved engine.
Figure 2:
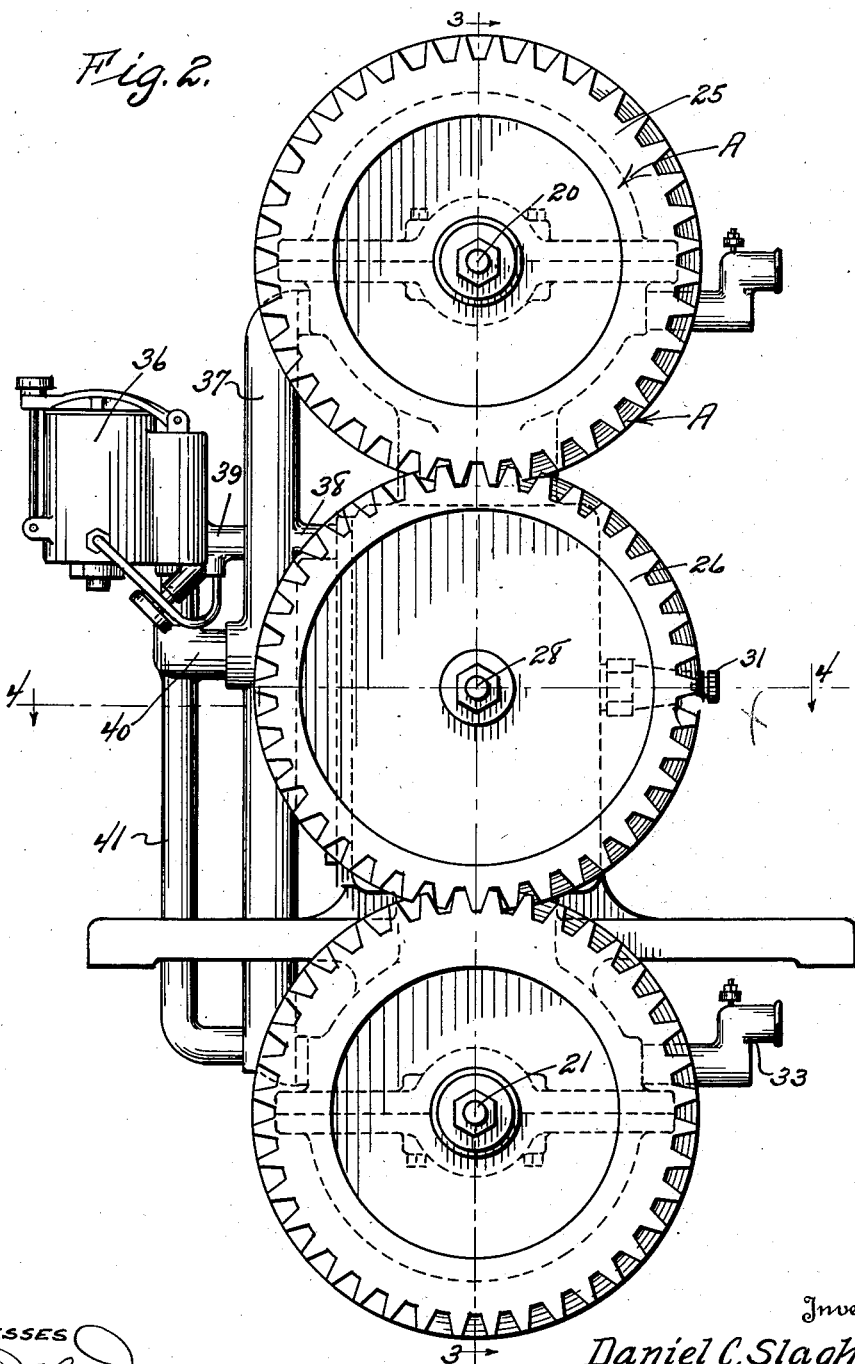
Figure 2 is an end elevation of the improved engine.
Figure 3:
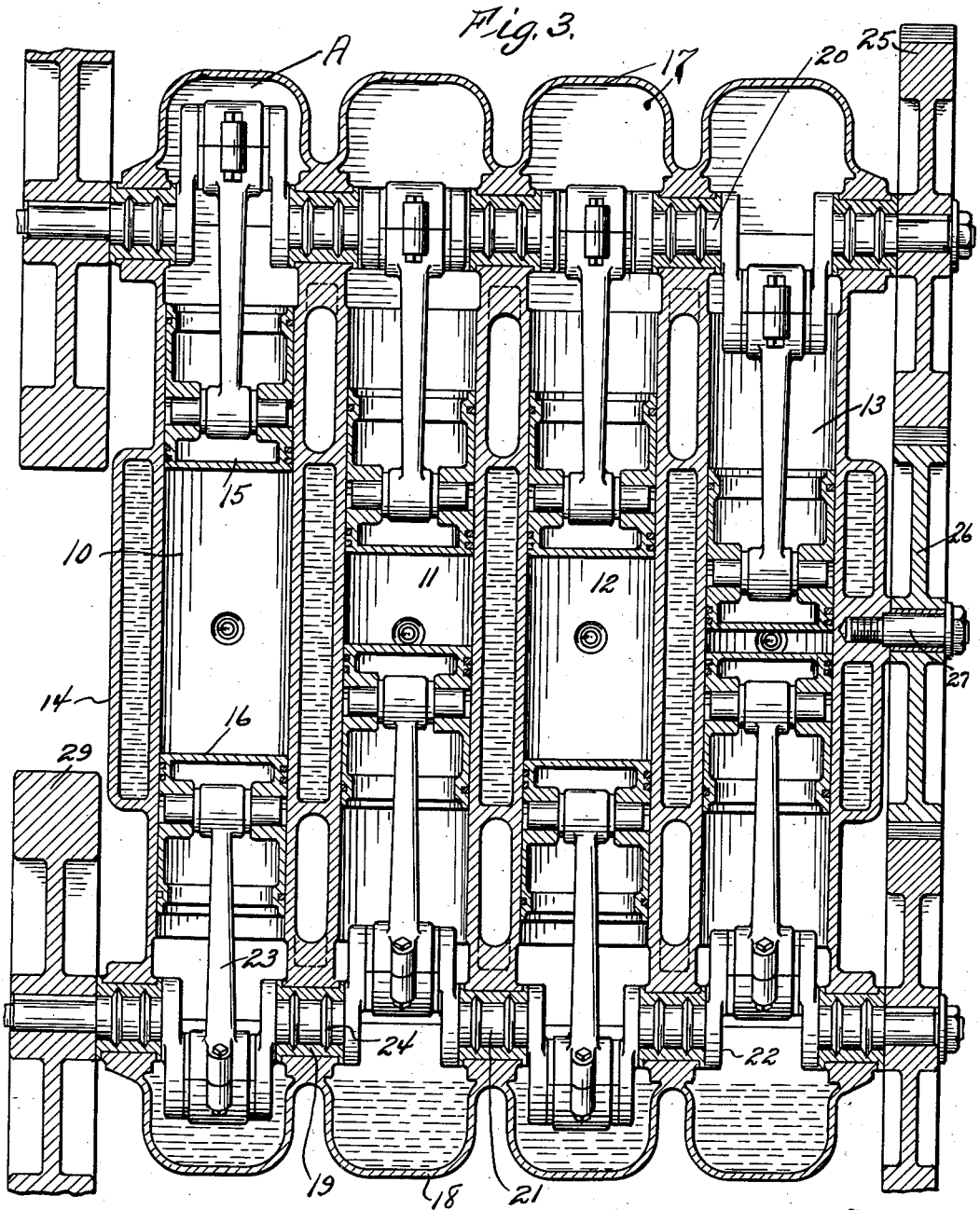
Figure 4:
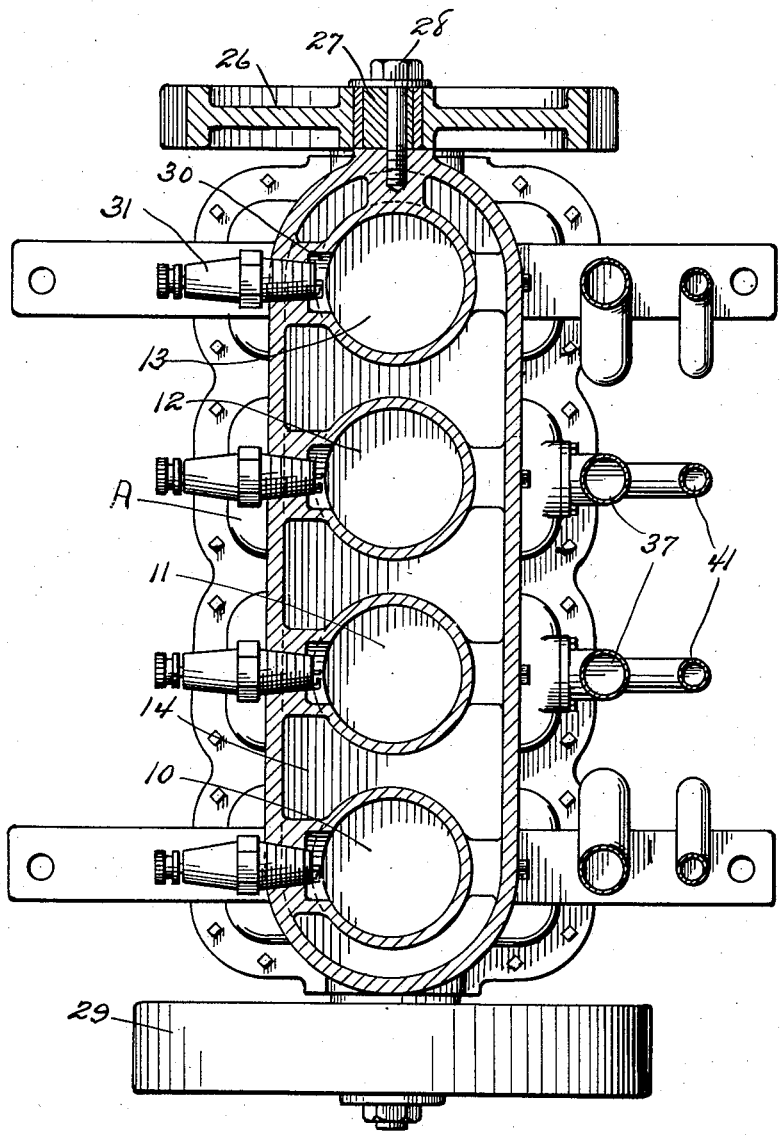
Figure 5:
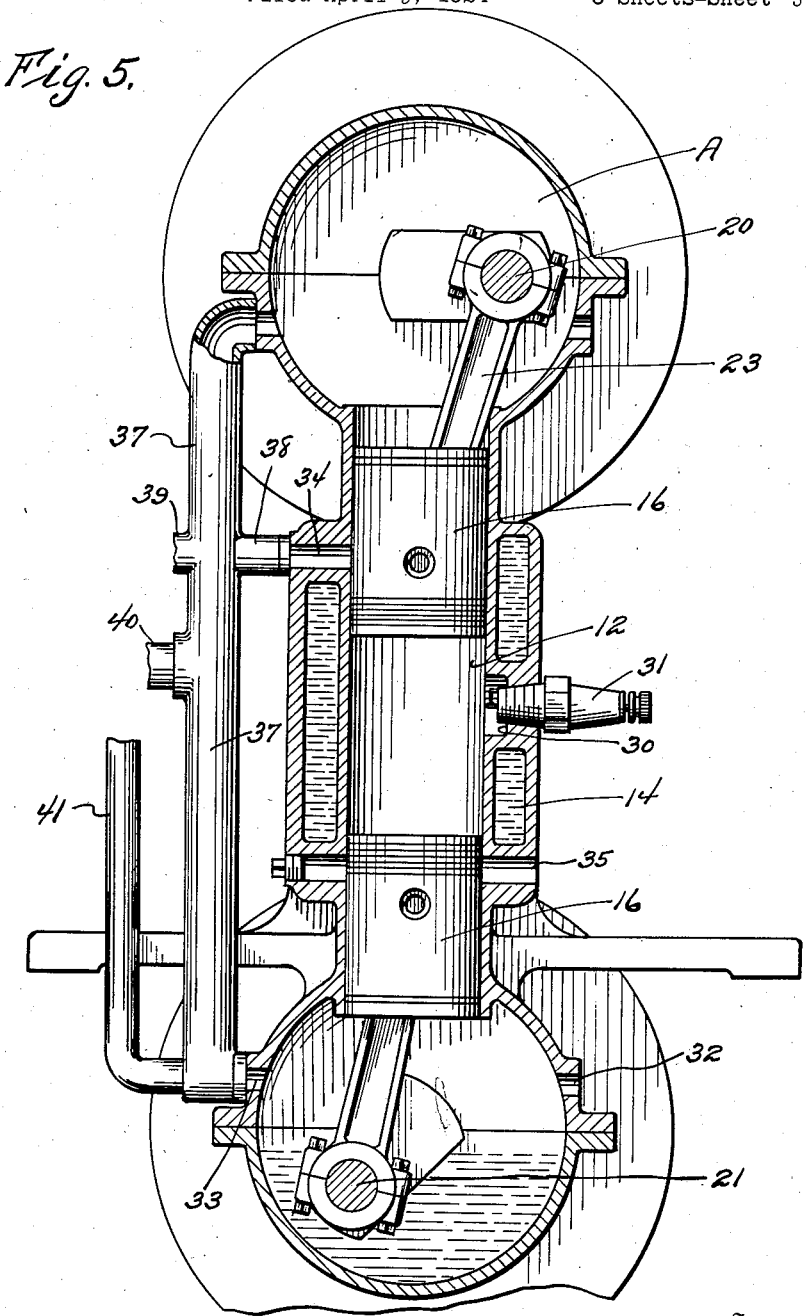

Figure 3 is a longitudinal section through the improved engine taken on the line 3—3 of Figure 2, Figure 4 is a horizontal section through the improved engine taken on the line 4—4 of Figure 2, and Figure 5 is a transverse section through the improved engine taken on the line 5—5 of Figure 1.

Referring to the drawings in detail, wherein similar reference characters designate corresponding parts throughout the several views, the letter A generally indicates the improved internal combustion engine, which comprises cylinders 10, 11, 12, and 13. These cylinders, are preferably, but not necessarily cast enbloc and are provided with water jackets 14 for cooling purposes. While I have shown the engine embodying four cylinders, as I have found that a maximum amount of benefit can be obtained from an engine of this type, it is to be understood that the engine can include more or less cylinders, as desired. Each cylinder has reciprocally mounted therein oppositely disposed pistons 15 and 16, which are adapted to be moved toward and away from each other. Crank cases 17 and 18 are bolted to the opposite ends of the cylinders and support suitable bearings 19 for the longitudinally extending crankshafts 20 and 21. By this construction, it is to be noted that there is a crankshaft arranged at each end of the cylinders. Each crankshaft is provided with four crank arms 22 and these crank arms 22 are arranged at quarters relative to one another. The crank arms 22 are connected to their respective pistons by the use of suitable connecting rods 23. It is to be also noted at this point that the crankshafts 20 and 21 have spaced collars 24 arranged thereon intermediate their crank arms for engaging bearings, so as to prevent leakage between the pistons and the position of these collars divides the crank cases into four independent compartments, for a purpose, which will be hereinafter more fully described. It is also to be noted that one of the pistons 15 and 16 is always arranged slightly in advance of the other so as to eliminate a dead center in the engine and in order to bring about this arrangement of the pistons the crank arms on one crankshaft are arranged in advance of the crank arms on the other crankshaft. By referring to Figure 5 of the drawings it can be seen that the upper crank arm is lying in substantially a horizontal plane while the lower crank arm is in advance of the upper crank arm and is just on the beginning of its up-stroke.

In order to connect the crankshafts 20 and 21 together for synchronous movement one terminal of each crank shaft has keyed thereto a gear 25 which is preferably of the herring bone type and these gears 25 have meshing therewith an idle connecting gear 26. This idle connecting gear 26 is rotatably mounted upon a suitable stub-shaft 27 which is held in place by a bolt 28 which extends into the engine. By referring to Figure 4 of the drawings it can be seen that the bolt 28 extends eccentrically into the stub-shaft 27, so that the idle gear 26 can be adjusted when necessary to take up wear or play between the gears 25. The opposite ends of the crank-shafts 20 and 21 have keyed or otherwise secured thereto fly wheels 29. The wall of each cylinder at a point intermediate the ends thereof is provided with a pocket 30 in which is fitted any preferred type of spark plug 31. It can be seen that the spark plug will be arranged directly between a pair of cylinders so as to bring about the igniting of the charge between the pistons, when the charge has been compressed by the said pistons.

Each compartment of the crank case has communicating and formed therein an inlet air port 32 provided with any preferred type of one-way air check valve 33. The opposite side of each compartment of each crank case is provided with a compressed air outlet port 33 for a purpose which will be hereinafter more fully described. It is to be noted however, that when the pistons ride into their respective cylinders toward each other that a suction will be caused in the crank case which will suck in air through the air inlet port 32, which is permitted by the valves 33. When the pistons move outwardly and away from each other it is obvious that the air drawn into the crank case will be placed under pressure. Each cylinder has formed therein an intake port 34 arranged at one side of the transverse center of its cylinder and an exhaust port 35 formed on the other side of its transverse center.

In the present instance a carbureter 36 is provided which is of an ordinary type as used on two cycle engines. A compressed air feed pipe 37 extends longitudinally of each cylinder and the terminals of the pipe are connected to the compressed air outlet ports 33 formed in each chamber of the crank case. The compressed air feed pipe 37 has communicating therewith an outlet pipe 38 which leads directly into the intake port 34 of the cylinder. Arranged in direct alignment with the pipe 38 is an inlet pipe 39 leading from the discharge end of the carbureter 36 and this pipe 39 communicates with the intake port 34. A branch pipe 40 communicates with the feed pipe 37 at a point substantially intermediate its ends and this pipe leads directly into the air intake of the carbureter. A second branch pipe 41 is provided which also communicates with the pipe 40 and the lower end of the pipe 37 and forms means for also supplying compressed air to the air intake of the carbureter.

By this construction it is to be noted that air under pressure is forced directly into the carbureter for forcing the fuel therefrom and spraying the fuel directly into the cylinder through the intake ports 34. Compressed air is also supplied directly to the cylinder through the pipe 37 and the branch pipe 38.

By referring to Figure 3 of the drawings it can be seen that the pistons 15 and 16 in the cylinder 30 are at the end of their compression stroke and a charge is ready for firing. The pistons 15 and 16 are on their downward compression stroke and fire immediately after the explosion takes place in the cylinder 13. The pistons in cylinder 10 are beginning on their downward stroke and fire after the explosion in cylinder 11. The pistons in cylinder 12 are on their upward stroke for compressing air in their respective chambers of the crank cases 17 and 18. Upon the outward stroke of the pistons air is being compressed in the crank case and at the extreme outward movement of the pistons the exhaust port 35 will be uncovered to permit the exhaust of the said gases from the cylinder. Immediately after the exhaust port 35 is uncovered the intake port 34 will be uncovered and the air under pressure will rush into the cylinder through the intake port 34 and forcibly inject a new charge therein. Upon the inward movement of the pistons the ports 34 and 35 will be covered and the charge will be compressed between the pistons and upon compression of the charge it can be fired by the spark plug 31 and another cycle takes place.

While any kind of fuel can be used with the engine, the same operates efficiently on kerosene and that is the type of fuel I prefer to use with the same.

Changes in detail may be made without departing from the spirit or the scope of this invention, but what I claim as new is:

1. In a two cycle internal combustion engine, a cylinder, a pair of oppositely disposed pistons reciprocally mounted within the cylinder, a spark plug carried by the cylinder and arranged at a point intermediate the ends thereof, an intake port formed in the cylinder on one side of the transverse center thereof, an exhaust port formed in the cylinder on the other side of the transverse center thereof, a crankshaft arranged at each end of the cylinder, means for operatively connecting the crankshafts together for synchronous movement, connecting rods for operatively connecting the crankshafts with the pistons, a crank case for each end of the cylinder having an air inlet port formed therein and a compressed air outlet port formed therein, the pistons being adapted to compress air into the crank cases upon the outward movement of the pistons, a supply pipe for operatively connecting the compressed air outlet ports of the crank cases together, a branch pipe for connecting the compressed air supply pipe with the intake port, a carbureter, means for operatively connecting the outlet of the carbureter to the intake port, and means for connecting the supply pipe with the air intake of the carbureter, as and for the purpose specified.

2. In an internal combustion engine, a cylinder, a pair of oppositely disposed pistons reciprocally mounted within the cylinder, a crank case disposed at each end of the cylinder, a crankshaft disposed at each end of the cylinder, connecting rods for operatively connecting the pistons to the crankshafts, a gear wheel keyed to one terminal of each crankshaft, a stub-shaft carried by the engine frame disposed at a point intermediate the ends of the cylinder, a bolt for connecting the stub-shaft to the engine and extending eccentrically through the stub-shaft, an idle gear rotatably mounted upon the stub-shaft meshing with the gears keyed to the crankshafts.

In testimony whereof I affix my signature.

DANIEL C. SLAGHT.